United States Patent
Suzuki et al.

(10) Patent No.: US 7,883,271 B2
(45) Date of Patent: Feb. 8, 2011

(54) ROLLING BEARING DEVICE AND ROTARY APPARATUS

(75) Inventors: Kazuya Suzuki, Kashiwara (JP); Kiyoshi Tanimoto, Kashiwara (JP); Hiroshi Ueno, Tondabayashi (JP); Shinji Fukuda, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 822 days.

(21) Appl. No.: 11/795,311

(22) PCT Filed: Jan. 16, 2006

(86) PCT No.: PCT/JP2006/000450

§ 371 (c)(1),
(2), (4) Date: Jul. 16, 2007

(87) PCT Pub. No.: WO2006/075741

PCT Pub. Date: Jul. 20, 2006

(65) Prior Publication Data

US 2008/0112661 A1   May 15, 2008

(30) Foreign Application Priority Data

Jan. 17, 2005 (JP) ............................. P2005-008936
Mar. 17, 2005 (JP) ............................. P2005-076473

(51) Int. Cl.
*F16C 33/474* (2006.01)

(52) U.S. Cl. ........................ 384/462; 384/470; 384/471; 384/474

(58) Field of Classification Search ................. 184/6.1, 184/6.3, 7.4; 384/462, 471, 473, 474, 470
See application file for complete search history.

(56) References Cited

U.S. PATENT DOCUMENTS 4,932,500 A    6/1990  Smith et al.

(Continued)

FOREIGN PATENT DOCUMENTS

AT    104273 B    10/1926

(Continued)

OTHER PUBLICATIONS

European Search Report dated Oct. 23, 2009.

(Continued)

*Primary Examiner*—William C Joyce
(74) *Attorney, Agent, or Firm*—McGinn IP Law Group, PLLC (57) ABSTRACT

In a rolling bearing including an oil supply unit for supplying lubricating oil stored in a tank by a pump via a nozzle which is made to open in an annular space defined between an inner ring and an outer ring, the nozzle is made to open in a space between an inner circumferential surface of a case and the inner ring, and the inner circumferential surface of the cage is formed into a surface in which an inside diameter of the cage is reduced gradually in a continuous or intermittent fashion from an axial center portion towards at least an end portion lying on a side where the nozzle is inserted, whereby a lubricating oil dropped on to the inner circumferential surface of the cage is caused to flow towards the axial center portion by virtue of centrifugal force generated by the rotation of the cage, so as to prevent the lubricating oil from flowing out to the outside of the bearing unit.

19 Claims, 9 Drawing Sheets

U.S. PATENT DOCUMENTS 5,971,107 A * 10/1999 Stitz et al. .................... 184/7.4

FOREIGN PATENT DOCUMENTS

| JP | 2002-54643 | 2/2002 |
| JP | 2002-89573 | 3/2002 |
| JP | 2002-130589 | 5/2002 |
| JP | 2002-213687 | 7/2002 |
| JP | 2004-108388 | 4/2004 |
| JP | 2004-183781 A | 7/2004 |
| JP | 2004-316707 | 11/2004 |

OTHER PUBLICATIONS

European Search Report dated Mar. 24, 2009.

* cited by examiner

ROLLING BEARING DEVICE AND ROTARY APPARATUS

TECHNICAL FIELD

The present invention relates to a rolling bearing device including a self-lubricating function, a rolling bearing device suitable for a machining tool which rotates at relatively high speed, and a rotary apparatus including the rolling bearing device.

BACKGROUND ART

Rolling bearings such as angular ball bearings are used for support of shafts which rotate at relatively high speed such as various types of spindles used on working tools. As lubricating methods for lubricating rolling bearings for supporting such spindles which rotate at high speed, conventionally, an oil-air lubricating method has mainly been used in many cases.

The oil-air lubricating method is a method for blowing a minute amount of lubricating oil which is intermittently supplied towards the rolling bearing through piping by virtue of compressed air, and in this method, since the lubricating oil is supplied to the bearing by being caused to forcibly pass through an air curtain formed around the rolling bearing which rotates at highs speed, the compressed air is used as a so-called carrier.

In the oil-air lubricating method like this, an oil-air lubricating device and a mixing valve, as well as a compressor and external piping are necessary externally of the spindle or the like in which the bearing, which is an object for lubrication, is incorporated, and in addition to this, passageways for oil and air need to be formed in an interior of the spindle or the like. This causes problems that the production costs are increased and that the noise level is increased due to the use of compressed air.

With a view to solving the problems, there has been proposed a rolling bearing device in which a lubricating oil supply mechanism installed in an interior of a rolling bearing (refer, for example, to Patent Document No. 1).

In this proposed technique, a tank for storing lubricating oil and a pump are mounted on a stationary ring side of the rolling bearing, and a nozzle is mounted on the pump in such a manner as to extend to open in the immediate vicinity of a rolling element which rolls between inner and outer rings of the rolling bearing, so that an extremely minute amount or, for example, several tens of nl (or several tens of μcc) of lubricating oil is dropped down towards the rolling elements which rotationally pass thereunder. By this configuration, since the lubricating oil is supplied to the inside of the air curtain which is formed when the rolling bearing rotates, compressed air such as that functioning as the carrier in the oil-air lubricating method becomes unnecessary, so as to solve the problem of noise, and moreover, the compressor and the oil-air lubricating device, as well as the external piping and internal piping also become unnecessary, in which the technique in Patent Document No. 1 becomes advantageous.

In the rolling bearing device with this type of lubricating function, how to cause the lubricating oil supplied from the nozzle to efficiently contribute to lubrication between the rolling elements and the bearing rings constitutes a crucial problem to be solved. Since the rotary rings, rolling elements and a cage of the rolling bearing rotate at high speed, there sometimes occur a case where the lubricating oil so supplied to adhere to any of the constituent elements of the rolling bearing is subject to force acting in a direction going away from the rotational center of the rotating constituent elements (hereinafter, referred to as centrifugal force) to thereby be made difficult to flow between the bearing rings and the rolling elements. When taking the centrifugal force like this into consideration, a preferred arrangement of the nozzle is represented by a nozzle position illustrated in a sectional view of a rolling bearing device shown in FIG. 9 which is taken along parallel to the axis thereof. In an example of a rolling bearing device shown in FIG. 9, a configuration is adopted in which a tank (not shown) for storing therein lubricating oil and an oil supply unit, which is made up of a pump 66 for sucking out the lubricating oil stored in the tank for discharge, a nozzle 67 mounted at a discharge port of the pump 66 in such a manner as to extend between an inner circumferential surface of the cage 64 and an outer circumferential surface of the inner ring 61 and to be made open at a distal end thereof and a drive unit (not shown) for driving the pump 66, are fixed to the immediate vicinity of a rolling bearing which is made up mainly of an inner ring 61, an outer ring 62, rolling elements 63 and a cage 64, or to a spacer 65 which is disposed adjacent to the outer ring 62 which constitutes a stationary ring of the bearing.

Figure 9:
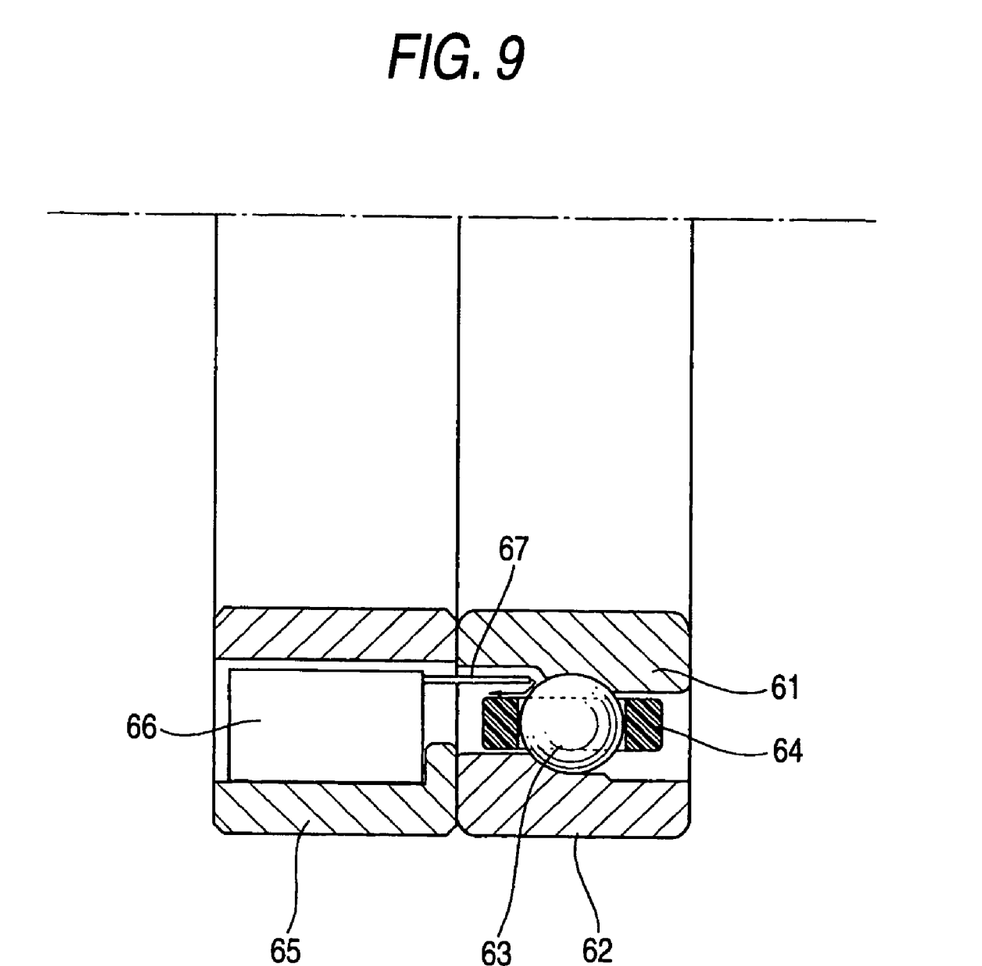
FIG. 9 is an axially parallel sectional view which shows a configuration example of a rolling bearing device with a conventional lubricating function.

According to the arrangement of the nozzle 67 like this, lubricating oil supplied from the distal opening of the nozzle 67 on to the inner circumferential surface of the cage is caused to move over the rolling elements 63 towards a raceway surface of the outer ring 62 and to be transferred to adhere to a raceway surface of the inner ring 61 via the rolling elements 63 by virtue of the centrifugal force generated by virtue of the rotation of the rolling bearing, thereby making it possible to lubricate the rolling bearing effectively.

Incidentally, in addition to the centrifugal force, force due to an airflow generated in the interior of the rolling bearing by virtue of the rotation of the bearing is also caused to act on the lubricating oil supplied from the nozzle which is made to open to the interior of the rolling bearing. Therefore, even in the event that a nozzle arrangement as shown in FIG. 9 is adopted so as to supply almost all the lubricating oil so supplied on to the inner circumferential surface of the retainer 64, there sometimes occurs a case where the lubricating oil is caused to flow on the inner circumferential surface of the cage 64 towards an opposite side to the rolling element 63 as indicated by an arrow shown in FIG. 9 to thereby flow out of the rolling bearing due to disturbance in the airflow in the interior of the bearing, and hence, it cannot be assured that the whole amount of lubricating oil supplied contributes to the lubrication of the bearing.

Conventionally, methods of jet lubrication, oil mist lubrication, oil-air lubrication and the like are known as methods for supplying lubricating oil into an annular space defined in a rolling bearing which is rotating at high speed.

In these methods, however, in order to cause lubricating oil to reach the inside of the annular space from the outside thereof, the lubricating oil needs to be pressurized or accelerated by compressed air, which results in large-scale appurtenant equipment including a compressor and the like. In addition, since an amount of lubricating oil that is more than required is supplied, a large amount of lubricating oil is eventually wasted. In order to prevent environmental pollution, a mechanism for recovering and circulating excess lubricating oil has been required.

To cope with this issue, as a method for supplying uniformly and securely a minute amount of lubricating oil to a plurality of bearings in a stable fashion from a single lubricating device without using a compressor, there has been proposed a lubricating device including nozzles for discharging lubricating oil to the bearings, oil lubricating pumps for supplying lubricating oil to the nozzles and a multi-distribution mechanism for distributing a minute amount of lubricating oil to each of the pumps (refer, for example, to Patent Document No. 2).

In addition, the inventor of the present application and others have also proposed compact rolling bearing devices in which a pump, a tank and an oil supply unit which includes a battery or a generator as a power supply are provided in an annular space of a rolling bearing (refer to Patent Document Nos. 1, 3 and the like).

Patent Document No. 1: JP-A-2004-108388
Patent Document No. 2: JP-A-2002-130589
Patent Document No. 3: JP-A-2004-316707

Incidentally, in the rolling bearing devices which adopt the conventional oil-air lubrication, oil mist lubrication or the lubricating mechanism disclosed in Patent Document No. 1 above, divided housings each having lubricating oil supply holes which are distributed in an equal number, a multi-distribution mechanism which is made up of a distributor or a rotary valve for distributing lubricating oil equally to each piping and a motor, and the like are necessary, and this still requires the complex configuration to remain around the bearing, thereby making it difficult to make the rolling bearing device small in size and reduce the production costs thereof. In particular, in the event that the piping is long which extends from the pump to the nozzle for supplying lubricating oil, the pulsation (pressure) of lubricating oil which is generated by the pump is attenuated, leading to a fear that a required lubricating oil discharging speed or lubricating oil discharge amount at the distal end of the nozzle cannot be obtained.

In addition, when the oil supply unit which includes the pump, the tank, and the battery or the power source are provided in the annular space of the rolling bearing, the configuration around the bearing becomes simple. However, the capacity of the tank is limited due to the power supply being so provided, whereby a period of time during which lubricating oil can be supplied becomes relatively short, and the costs are increased. In particular, in the event that the oil supply unit is not provided with a sensor for detecting peripheral conditions, since the rotational state of the bearing cannot be detected, when the rolling bearing does not rotate, the oil supply unit has to manually be stopped so as to prevent a continued wasteful supply of lubricating oil.

Furthermore, in a case where the rolling bearing with the oil supply unit is incorporated in the housing, it becomes difficult to manually stop the oil supply unit, or even though the oil supply unit can be stopped manually, there is caused a fear that a leakage of lubricating oil occurs due to heat being generated on the periphery of the bearing immediately after the rotation of the bearing is stopped.

In addition, in a case where the plurality of rolling bearings are provided, it is difficult to stop the rolling bearings altogether at one time, and the discharge of lubricating oil cannot be stopped at a suitable timing for the stop of rotation of the bearings. Because of this, there is caused a possibility that excess lubricating oil is discharged into the annular spaces in the bearings.

DISCLOSURE OF THE INVENTION

Problem to be Solved by the Invention

The invention has been made in view of the situations, and an object thereof is to provide a rolling bearing device which can introduce lubricating oil between the rolling elements and the bearing rings in a more ensured fashion and can cause the lubricating oil so supplied to contribute to lubrication of the bearing more effectively when compared with a rolling bearing having the conventional self-lubricating function.

Furthermore, another object of the invention is to provide a low-cost rolling bearing device which is configured compact and simple on the periphery of a rolling bearing and which can maintain good lubrication even with a small amount of lubricating oil and a rotary apparatus in which external piping and appurtenant equipment for lubrication are attempted to be eliminated as much as possible by utilizing the rolling bearing device.

Means for Solving the Problem

With a view to attaining the objects, according to aspects of the invention, this patent application has the following configurations.

(1) A rolling bearing device comprising:
a rolling bearing comprising an inner ring, an outer ring, a plurality of rolling elements which are rollably disposed between the inner ring and the outer ring, and an annular cage for holding the plurality of rolling elements at predetermined intervals in a circumferential direction;
a nozzle which communicates with a tank for storing lubricating oil and is inserted between an inner circumferential surface of the cage and the inner ring and made to open; and
a pump which supplies the lubricating oil stored within the tank into the rolling bearing via the nozzle,
wherein the inner circumferential surface of the cage is formed so that an inside diameter of the cage is gradually reduced in a continuous or intermittent fashion from an axial center portion side towards an end surface portion on a side where the nozzle is inserted.

(2) The rolling bearing device according to (1), wherein a portion of the inner circumferential surface of the cage which lies on an opposite side to the side where the nozzle is inserted is formed so that the inside diameter of the cage is gradually reduced in a continuous or intermitted fashion from the axial center portion side towards an end face on the opposite side.

(3) A rolling bearing device comprising:
a rolling bearing disposed inside a housing for supporting a rotating shaft rotatably relative to the housing and comprising an outer ring, an inner ring and a plurality of rolling elements which are interposed between the outer ring and the inner ring;
a pump provided within or in the vicinity of an annular space defined between the outer ring and the inner ring;
a nozzle disposed in the annular space at least at one end thereof in such a manner as to be made to open in the annular space and made to communicate with a discharge port of the pump at the other end thereof;
a tank for storing therein lubricating oil made to communicate with the pump; and
a pump driving driver connected to the pump for controlling a lubricating oil discharge amount of the pump,
wherein the pump driving driver is connected to an external power supply which is set externally of the housing to activate the pump by a current supplied from the external power supply so as to supply the lubricating oil stored in the tank from the opening provided at the one end of the nozzle into the annular space.

(4) The rolling bearing device according to (3), wherein the tank is disposed in the vicinity of the pump.

(5) A rolling bearing device comprising:
a plurality of rolling bearings disposed coaxially inside a housing for supporting a rotating shaft rotatably relative to the housing and each including raceway members made up of an outer ring and an inner ring and a plurality of rolling elements which are disposed between the raceway members;

pumps which are provided respectively within or in the vicinity of annular spaces defined between the raceway members of the plurality of rolling bearings;

nozzles disposed respectively in the annular spaces of the plurality of rolling bearings at one end thereof so as to be made to open in the annular spaces and made to communicate, respectively, with discharge ports of the pumps at the other end;

a tank for storing therein lubricating oil made to communicate with the pumps; and pump driving drivers connected respectively to the pumps for controlling respective lubricating oil discharge amounts of the pumps, wherein the pump driving drivers are connected to a controller which is disposed externally of the housing and transmits signals and controls respective operations of the drivers, and wherein the pump driving drivers are connected to an external power supply which is set externally of the housing to activate the pumps by a current supplied from the external power supply so as to supply the lubricating oil stored in the tanks from the openings provided at the one end of the nozzles into the annular spaces, respectively.

(6) The rolling bearing device according to (5), wherein tanks are disposed in the vicinity of the pumps, respectively, for supplying lubricating oil individually to the pumps.

(7) The rolling bearing device according to (5) or (6), wherein the controller transmits signals which control the discharge of lubricating oil to the pumps, respectively when the rotating shaft is rotated.

(8) The rolling bearing device according to (5) or (6), wherein the controller controls respective operations and lubricating oil discharge amounts of the pumps by permitting and prohibiting a flow of a current supplied from the external power supply, instead of transmitting the control signals to the pump driving drivers, respectively.

(9) A rotary apparatus in which a rotating shaft disposed within a housing thereof is supported by the rolling bearing device according to any one of (5) to (8).

(10) The rotary apparatus according to (9), wherein the rotating shaft is driven by a motor, and the external power supply of the rolling bearing doubles as a drive power supply for the motor.

(11) The rotary apparatus according to (9) or (10), wherein the rotating shaft is driven by a motor of which drive control is performed by the controller, and the drive control of the motor and the control of the pump driving drivers are controlled by the controller in conjunction with each other.

The invention according to (1) is intended to prevent the lubricating oil from scattering to the outside of the bearing by applying a force directed towards the axial center portion of the bearing by virtue of centrifugal force to the lubricating oil supplied towards the inner circumferential surface of the cage by forming the inner circumferential surface of the cage, that is, the face of the cage which faces an outer circumferential surface of the inner ring in such a manner as to reduce the inside diameter of the cage from the axial center portion side towards the end surface portion at least on the side where the nozzle is inserted.

Namely, the nozzle for supplying lubricating oil is inserted and made to open in the space between the cage and the inner ring, and the inner surface of the cage is formed into a tapered surface, or a stepped surface or a curved surface which is formed similarly to the tapered surface in which the inside diameter of the cage at the end face portion where the nozzle is inserted is gradually reduced in the continuous or intermittent fashion relative to the inside diameter of the cage at the axial center portion in the continuous or intermittent fashion, whereby the lubricating oil supplied to the inner circumferential surface of the cage is subject to a force generated towards the axial center portion of the cage by virtue of the rotation of the case associated with the rotation of the bearing, thereby making it possible to reduce the amount of lubricating oil which flows to the outside of the bearing or eliminate such a flow of lubricating oil.

In addition, as with the invention according to (2), the portion of the inner circumferential surface of the cage which lies on the axially opposite side to the side where the nozzle is inserted is also formed into a tapered surface, or a stepped surface or a curved surface in which the inside diameter of the cage is reduced towards the end portion side in a similar way to (1) above, whereby even though the lubricating oil supplied from the discharge port of the nozzle to the inner circumferential surface of the cage moves towards the opposite side across the axial center, the lubricating oil so moving is prevented from flowing out from an end face on the opposite side of the cage to the outside of the bearing.

According to the invention, in the rolling bearing device having the function to supply the lubricating oil stored in the tank directly into the interior of the rolling bearing by inserting the nozzle into the annular space defined between the inner and outer rings of the rolling bearing, as a result of preventing the supplied lubricating oil from flowing out to the outside of the bearing, the utilization efficiency of lubricating oil is increased, and in the case of a lubricating oil storage tank of a type in which lubricating oil cannot be refilled, the life of lubricating oil so stored therein can be extended, whereas in the case of a lubricating oil storage tank in which lubricating oil can be refilled, a refill interval of lubricating oil can be extended.

According to the invention described in (3), the necessity of disposing large-scale equipment such as a compressor on the periphery of the bearing is obviated, and hence, the whole of the bearing unit can be configured compact, and a required amount of lubricating oil is allowed to be supplied (or dropped down) directly to the immediate vicinity of the rolling elements. In addition, the rolling bearing device can easily be controlled with respect to start and stop of supply of lubricating oil and/or supply amount of lubricating oil from the outside of the bearing.

According to the invention described in (4), only a code for supplying current to the driver and short piping for establishing a connection between the tank and the pump have to be provided on the periphery of the bearing, and hence, other equipment than the power supply can be incorporated in or in the vicinity of the annular space. In addition, the oil supply unit can be realized which operates in an autonomic fashion only by supplying current, and there is also provided merit that a required minimum amount of lubricating oil can be supplied to the vicinity of the rolling elements with accuracy without being affected by long piping.

Furthermore, when compared with the conventional oil supply unit for a rolling bearing, the capacity of the lubricating oil storage tank can be increased, and hence, the period of time for lubrication (namely, the maintenance interval) can be extended. In addition, with the same capacity as that of the conventional tank, the rolling bearing or a member thereof where the tank is provided can be reduced in size.

According to the invention described in (5), even in the case of the rolling bearing device including the plurality of rolling bearings, as with the invention described in (1), the necessity of disposing large-scale equipment such as a compressor on the periphery of the bearing is obviated, and hence, the whole of the bearing unit can be configured compact. In addition, the oil supply units which are made to operate individually can be controlled in a centralized fashion from the controller disposed externally of the housing, whereby start and stop of supply of lubricating oil and/or supply amount of lubricating oil can be controlled altogether from the outside of the bearing.

Note that in the invention, the positions where the pump and the nozzle are provided reside within the housing, and there is no specific restriction on the positions, provided that the positions are within or in the vicinity of the annular space of the rolling bearing. However, the one end (the distal end) of the nozzle needs to extend across an air curtain (an air barrier) which is formed when the bearing rotates so as to face the vicinity of the rolling elements. In addition, since the supply of lubricating oil in a minute amount becomes difficult unless the pump is placed in a position close to the nozzle, in the event that the pump is disposed outside the annular space of the bearing, a configuration is desirably adopted in which the pump is provided on a member which is disposed close to the rolling bearing within the housing, that is, a spacer which is fixed adjacent to the stationary ring, a lid element for covering an end portion of the housing or the housing itself.

According to the invention described in (6), only wiring such as a cord which supplies current to the driver, a code for transmitting a signal which controls the driver or a code which connects the driver with the pump and short piping which establishes a connection between the tank and the pump have to be provided on the periphery of each bearing, whereby other equipment than the power supply can be incorporated within or in the vicinity of the annular space in each bearing as much as possible.

According to the invention described in (8), the connection between the controller and the driver is implemented only by the cord through which current is supplied, and hence wiring is made simple.

According to the rotary apparatus for supporting a rotating shaft disposed within the housing by any of the rolling bearing devices according to (5) to (8) in the way described above, the rotary apparatus itself can hold the function to lubricate the bearing, thereby making it possible to make unnecessary the whole or part of the external equipment for lubricating oil. In addition, this rotary apparatus can control the discharge amount of lubricating oil with accuracy.

According to the configurations that have been described theretofore, the rotation of the rotating shaft, discharge of lubricating oil and discharge amount of lubricating oil are allowed to be linked with each other, whereby not only the wasteful discharge of lubricating oil can be prevented but also the duplicate provision of similar equipment on the rolling bearing device and the rotary apparatus can be eliminated, thereby making it possible to reduce the production costs of the whole rotary apparatus. Additionally, in a working tool with a programmable controller, an elaborate control of start and stop of supply of lubricating oil or adjustment in lubricating oil amount can be attained in such a manner as to match the rotational speed of the spindle as the rotary apparatus by utilizing control signals from the programmable controller, and this eliminates the wastage of lubricating oil supplied, thereby making it possible to maintain good lubrication of the rotary apparatus with a minimum amount of lubricating oil.

ADVANTAGES OF THE INVENTION

According to the rolling bearing device of the invention that has been described heretofore, the rolling bearing device can be configured compact and simple without providing appurtenant equipment such as the compressor, and hence, the whole rolling bearing device can be configured at low cost. In addition, since the lubricating oil can be supplied (dropped down) to the required location with accuracy, the lubricating oil is not wasted, thereby making it possible to maintain good lubrication of the rolling bearing device with a small amount of lubricating oil over a long period of time.

Furthermore, when compared with the rolling bearing device including the conventional oil supply unit, the lubricating oil can be discharged over a long period of time, or with the same amount of lubricating oil as that of the conventional oil supply unit maintained, the oil supply unit and hence, the rolling bearing device can be configured compact.

In addition, according to the rotary apparatus of the invention, the rotary apparatus can lubricate itself without any help from any other member, and hence, the whole or part of the external device and external piping for lubrication can be made unnecessary, whereby not only the reduction in production costs and simplification in configuration of the bearing unit can be realized but also the integral control including lubrication of the rotary apparatus can be realized.

BEST MODE FOR CARRYING OUT THE INVENTION

First Embodiment

Hereinafter, a first embodiment of the invention will be described by reference to the drawings.

Figure 1:
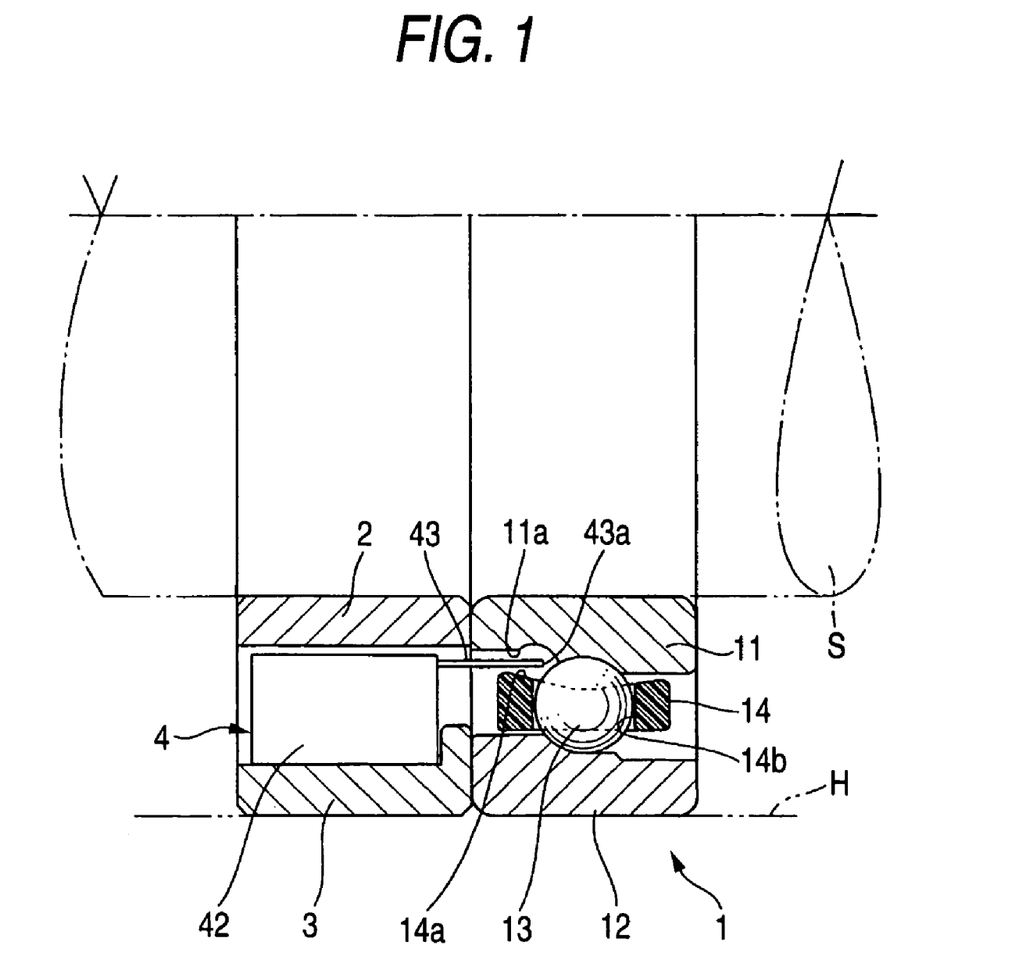
FIG. 1 is an axially parallel sectional view of an embodiment of the invention.
Figure 2:
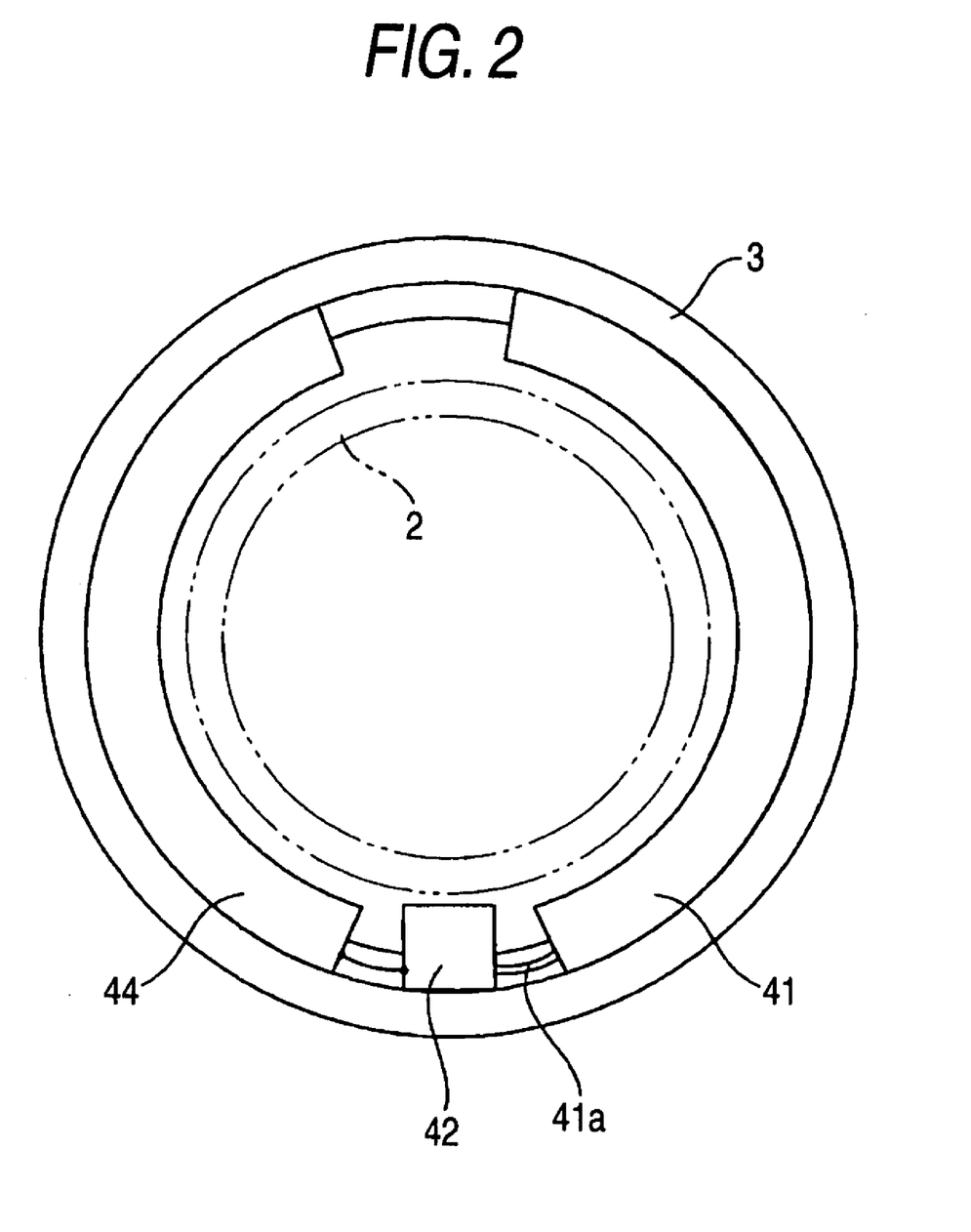
FIG. 2 is a left side view of an outer ring spacer 3 shown in FIG. 1.

FIG. 1 is an axially taken sectional view of a first embodiment of the invention, and FIG. 2 is a left side view of an outer ring space 3 of the first embodiment.

This embodiment shows an example in which an oil supply unit 4 is disposed on, of an inner ring spacer 2 and the outer ring spacer 3 which are disposed adjacent to each other in an angular ball bearing 1, the outer ring space 3 which constitutes a spacer on a stationary side of the bearing 1.

The angular ball bearing 1 has a construction in which a plurality of rolling elements (balls) 13 are held at predetermined intervals in a circumferential direction between an inner ring 11 and an outer ring 12 by a cage 14, and in this embodiment, the outer ring 12 is incorporated in a housing H as a stationary ring, and a shaft S is fixed to an inner circumferential surface of the inner ring 11.

The oil supply unit 4 is made up mainly of a tank 41 for storing lubricating oil, a pump 42 which communicates with the tank 41 via a pipe 41a in such a manner as to suck out and discharge the lubricating oil stored in the tank 41, a nozzle 43 which is mounted at a discharge port of the pump 42 and a drive circuit 44 for the pump 42, and these constituent members of the oil supply unit 4 are fixed to an inner circumferential surface of the outer ring spacer 3 therealong. In addition, as is shown in FIG. 1, the nozzle 43 is inserted from an axial end side of the rolling bearing 1 into a space defined between the inner ring 11 and the cage 14, and a distal-end opening 43a of the nozzle 43 is made to open between an inner circumferential surface 14a of the cage 14 or the rolling element 13 and an outer circumferential surface 11a of the inner ring 11.

Figure 3:
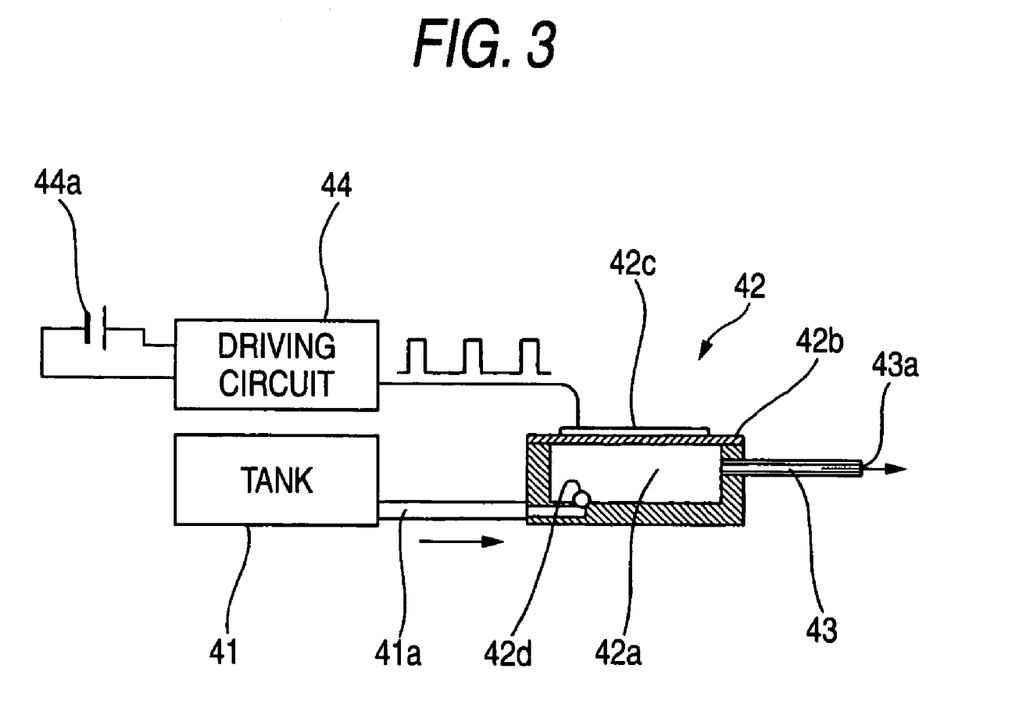
FIG. 3 is a drawing showing an overall configuration example of an oil supply unit in the embodiment of the invention.

An overall configuration example of the oil supply unit 4 is shown in FIG. 3 where an exemplary diagram showing a mechanical configuration and a block diagram showing an electrical configuration are shown together.

The pump 42 is made up of a pump chamber 42a, a diaphragm 42b which forms one wall portion of the pump chamber 42a, a piezoelectric element 42c affixed to the diaphragm 42b and a check valve 42d which is provided at a connecting portion between the pump chamber 42a and the pipe 41a. The drive circuit 44 includes a power supply battery 44a and supplies, for example, a rectangular voltage signal to the piezoelectric element 42c. In this configuration, when a rectangular voltage signal is applied to the piezoelectric element 42c, the diaphragm 42b is displaced vertically as viewed in the figure. When the diaphragm 42b is displaced upwards, lubricating oil in the tank 41 is sucked into the pump chamber 42a via the check valve 42d and the pipe 41a, whereas when the diaphragm 42b is, following the upward displacement thereof, displaced downwards, the lubricating oil within the pump chamber 42a is discharged towards the nozzle 43 so as to be supplied from the distal-end opening 43a of the nozzle 43 towards the inner circumferential surface of the cage 14. When the lubricating oil is discharged by the pump 42, the lubricating oil inside the pump chamber 42a is prevented from returning to the pipe 41a side in any case by virtue of the existence of the check valve 42d. An amount of lubricating oil that is to be supplied to the angular ball bearing 1 is an extremely minute amount of the order of 30 nl (30 μcc). In addition, depending upon utilization conditions, the supply amount of lubricating oil can be changed to several hundreds of pl to several hundreds of nl.

A most prominent feature of this first embodiment resides in the shape of the inner circumferential surface 14a of the cage 14 of the angular ball bearing 1. The cage 14 is a machined resin cage which is formed substantially into a cylindrical shape as a whole and in which pockets 14b for accommodating the rolling elements 13 are formed at predetermined intervals in a cylindrical portion thereof, however, the inner circumferential surface is formed into a tapered surface in which inside diameters at both end portions are made smaller than an inside diameter of the cage at an axial center portion thereof in such a manner that the inside diameters of the cage at positions lying on both sides of the axial center portion are decreased more as the inner circumferential surface of the cage extends towards the end portions from the axial center portion thereof.

According to the first embodiment that is configured as has been described heretofore, the lubricating oil discharged from the distal-end opening 43a of the nozzle 43 is supplied on to the inner circumferential surface 14a of the cage 14, and almost all of the lubricating oil so supplied is then caused to flow over the inner circumferential surface 14a of the cage 14 towards the axial center thereof by the action of centrifugal force generated by virtue of rotation of the cage 14, there being no case where the lubricating oil flows towards the end portion sides to flow out therefrom to the outside of the bearing. Then, the lubricating oil which flows over the inner circumferential surface 14a of the cage 14 towards the axial center reaches the pocket 14b to thereby adhere to the surface of the rolling element 13. The lubricating oil so adhering to the rolling element 13 is then led to a raceway surface of the outer ring 12 and a raceway surface of the inner ring 11 when the rolling element 13 rotates on its own axis while rolling along the raceway surfaces of both the bearing rings, so as to be transferred thoroughly on to the entirety of the angular ball bearing 1 for efficient lubrication thereof.

Figure 4:
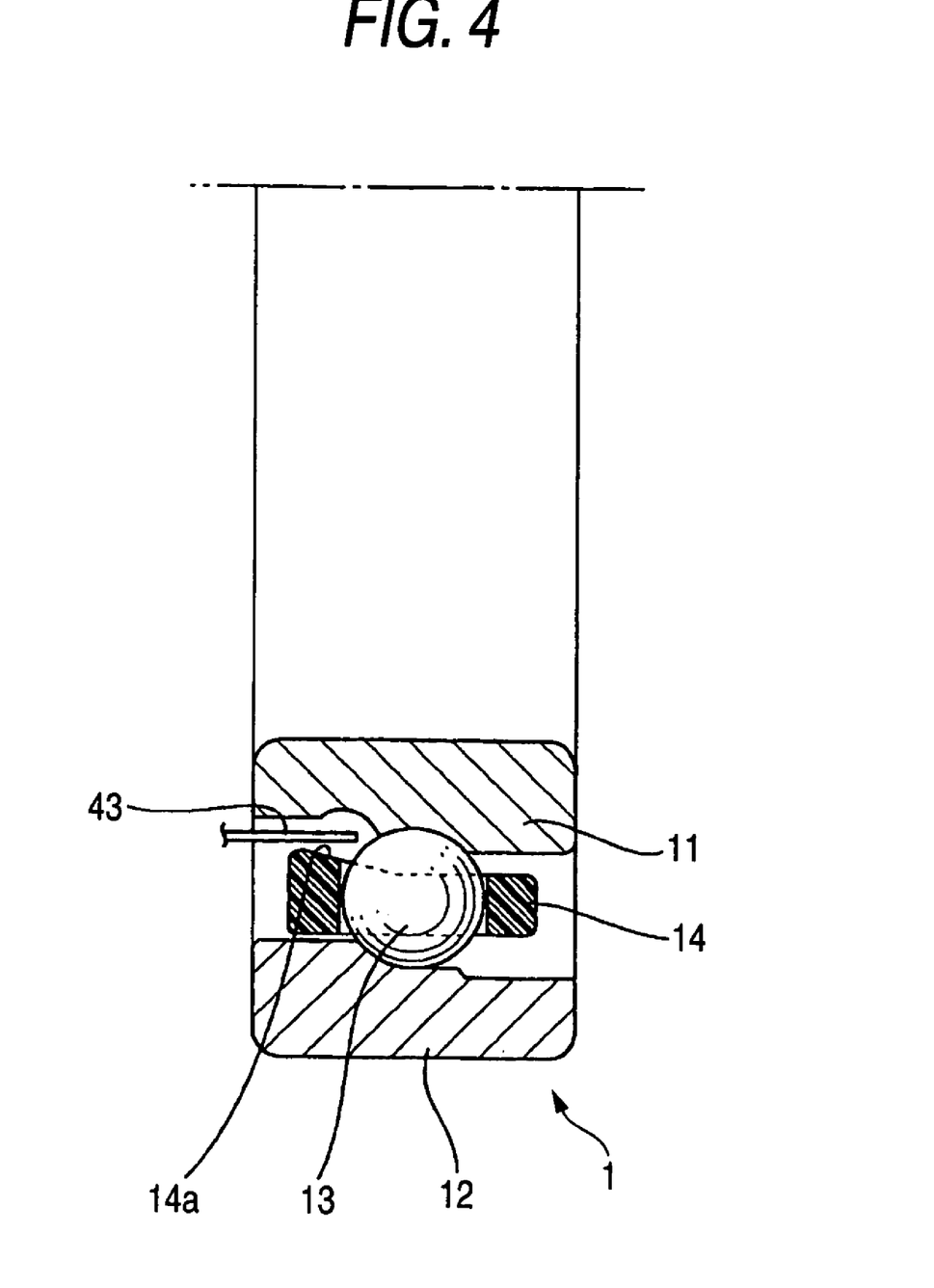
FIG. 4 is an axially parallel sectional view showing a modified example to the embodiment of the invention.

Here, in the first embodiment, the shape of the inner circumferential surface 14a of the cage 14 is made into the tapered surface in which the inside diameters at both the end portions are made smaller than the inside diameter of the cage at the axial center portion thereof in such a manner that the inside diameters of the cage at positions lying on both the sides of the axial center portion are decreased more as the inner circumferential surface of the cage extends towards the end portions from the axial center portion thereof, whereby even in the event that lubricating oil supplied to a portion on the inner circumferential surface 14a which lies on the side where the nozzle 43 is inserted flows across the axial center portion to the opposite side, the lubricating oil is prevented from flowing out from the end portion on the opposite side to the outside of the bearing. However, the tapered surface on the opposite side does not necessarily have to be so provided. FIG. 4 is an axially parallel sectional view which shows a modified example to the embodiment which incorporates therein the configuration where no tapered surface is provided on the opposite side of the inner circumferential surface of the cage. In this modified example, a tapered surface, which is similar to that described above, is formed on a portion on an inner circumferential surface 14a of a cage 14 which extends from an axial center portion to an end portion lying on the side where the nozzle 43 is inserted, while a cylindrical surface is formed on a portion on the inner circumferential surface which extends from an end portion on an opposite side to the side where the nozzle 43 is inserted to the axial center portion. Even by this configuration, depending upon conditions where the bearing is used, an equivalent function and advantage can be provided to those provided in the embodiment described above.

Second Embodiment

Figure 5:
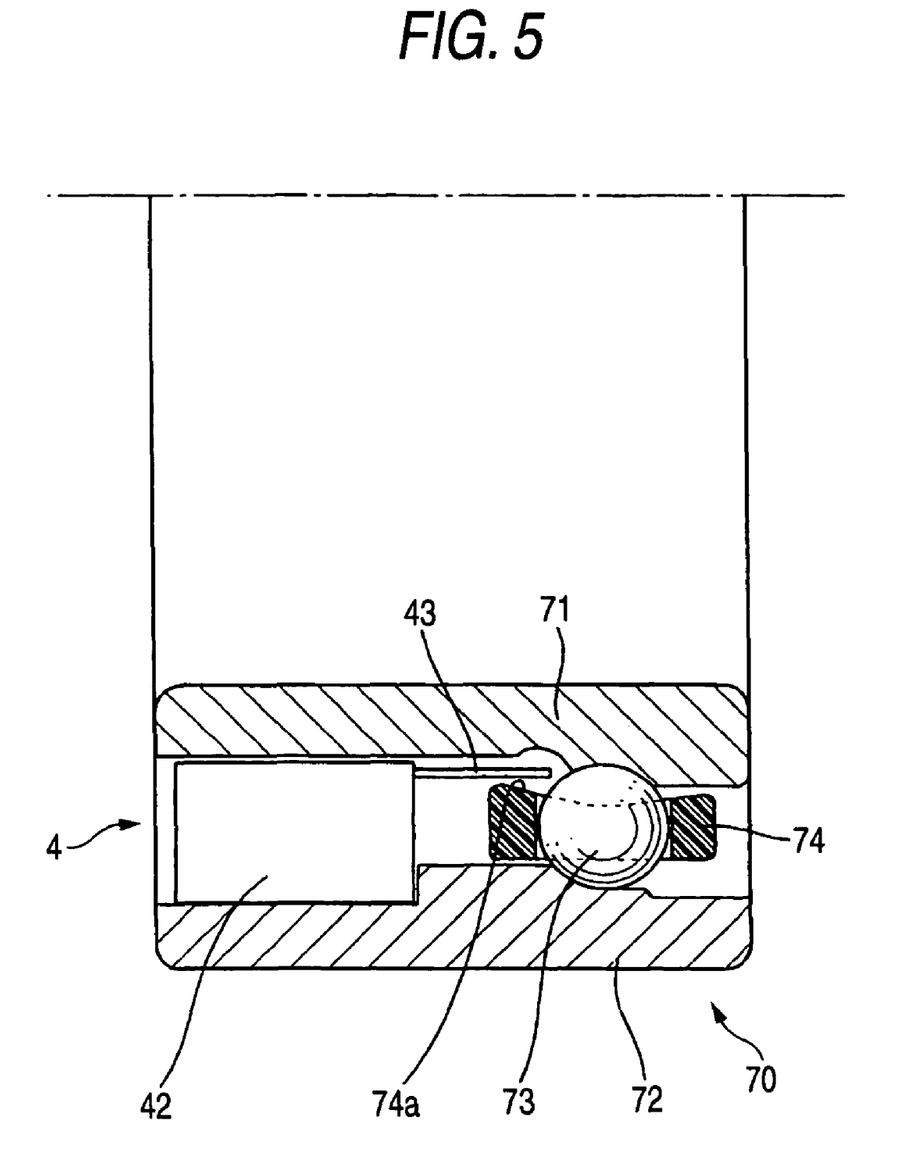
FIG. 5 is an axially parallel sectional view of another embodiment of the invention.

While in the first embodiment that has been described above, the oil supply unit 4 is described as being disposed externally adjacent to the angular ball bearing 1, as is shown in an axially parallel sectional view in FIG. 5, an oil supply unit 4 may be supplied in the interior of the bearing. Namely, in a second embodiment shown in FIG. 5, similarly to the previous embodiment, an angular ball bearing 70 includes an inner ring 71, an outer ring 72, rolling elements 3 and a cage 74. In this angular ball bearing 70 so configured, one end side of each of the inner ring 71 and the outer ring 72 is extended axially so as to increase a width dimension of each of the rings, and an oil supply unit 4, which is similar to that of the first embodiment, is disposed on the extended portion of the outer ring 72. Also in this embodiment, a nozzle 43 which is mounted at a discharge port of a pump 42 is inserted between an inner circumferential surface 74a of the cage 74 and the inner ring 71 in such a manner as to be made open at a distal end thereof, and a tapered surface is imparted to the inner circumferential surface 74a of the cage 74 in such a manner that an inside diameter of the cage 74 is reduced more towards end portion sides, whereby a similar function and advantage to those provided in the above embodiment and its modified example can be provided.

Furthermore, in the embodiments and modified example, while the tapered surface is imparted to the inner circumferential surface of the case in such a manner that the inside diameter of the cage is reduced more towards the end portion sides, even in the event that a surface or curved surface is imparted to the inner circumferential surface in such a manner that the inside diameter is reduced more gradually in a stepped fashion towards the end portion sides, substantially a similar function and advantage to those of the embodiments and modified example can, of course, be provided.

In addition, in the embodiments and modified example that have been described above, while the angular ball bearing is described as being used as the rolling bearing, the rolling bearing device of the invention can, needless to say, be applied to other rolling bearings than the angular ball bearing.

Third Embodiment

Hereinafter, a third embodiment of the invention will be described by reference to the drawings.

Figure 6:
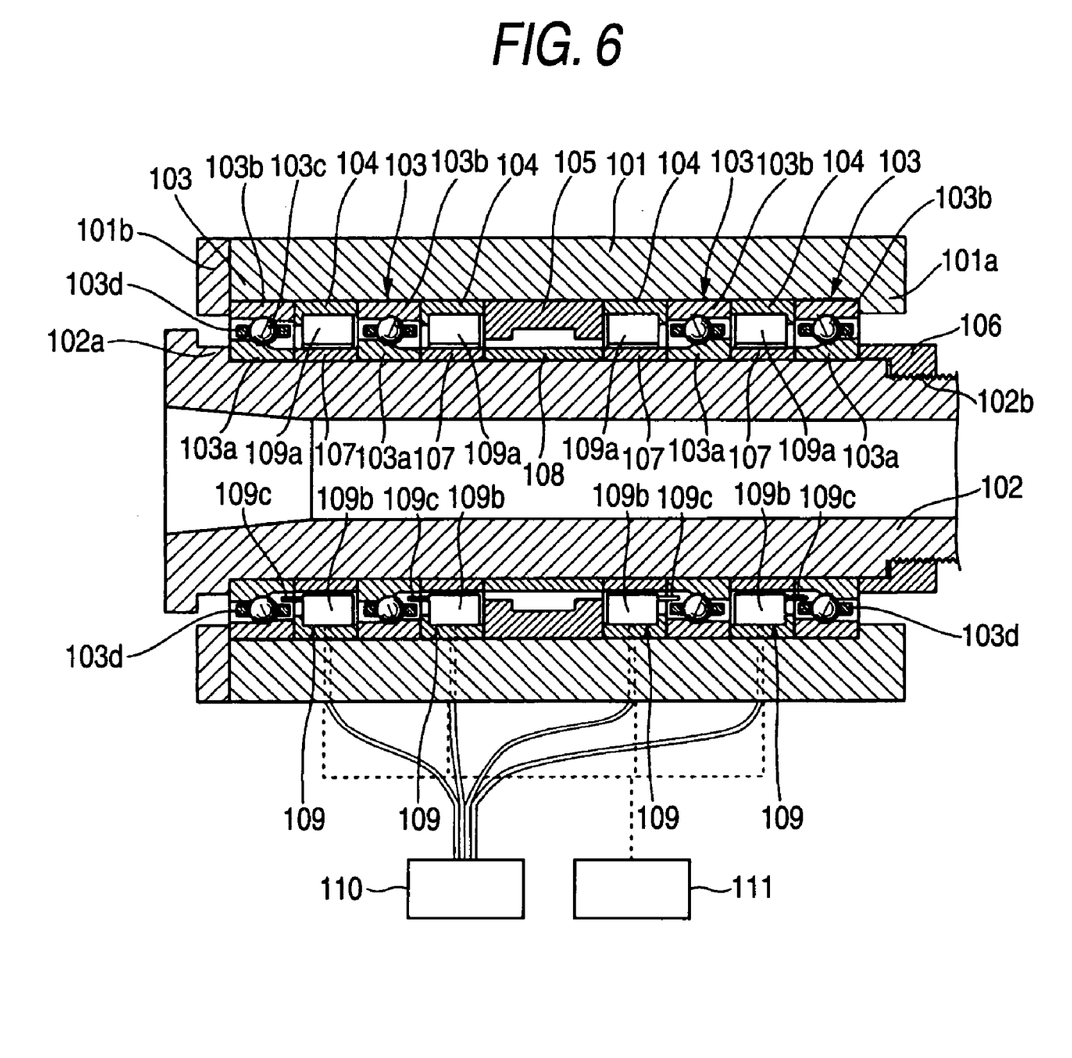
FIG. 6 is a drawing showing together an axially parallel sectional view which shows the configuration of a rotary apparatus according to a further embodiment of the invention and a block diagram which shows the configuration of external lubricating devices.
Figure 7:
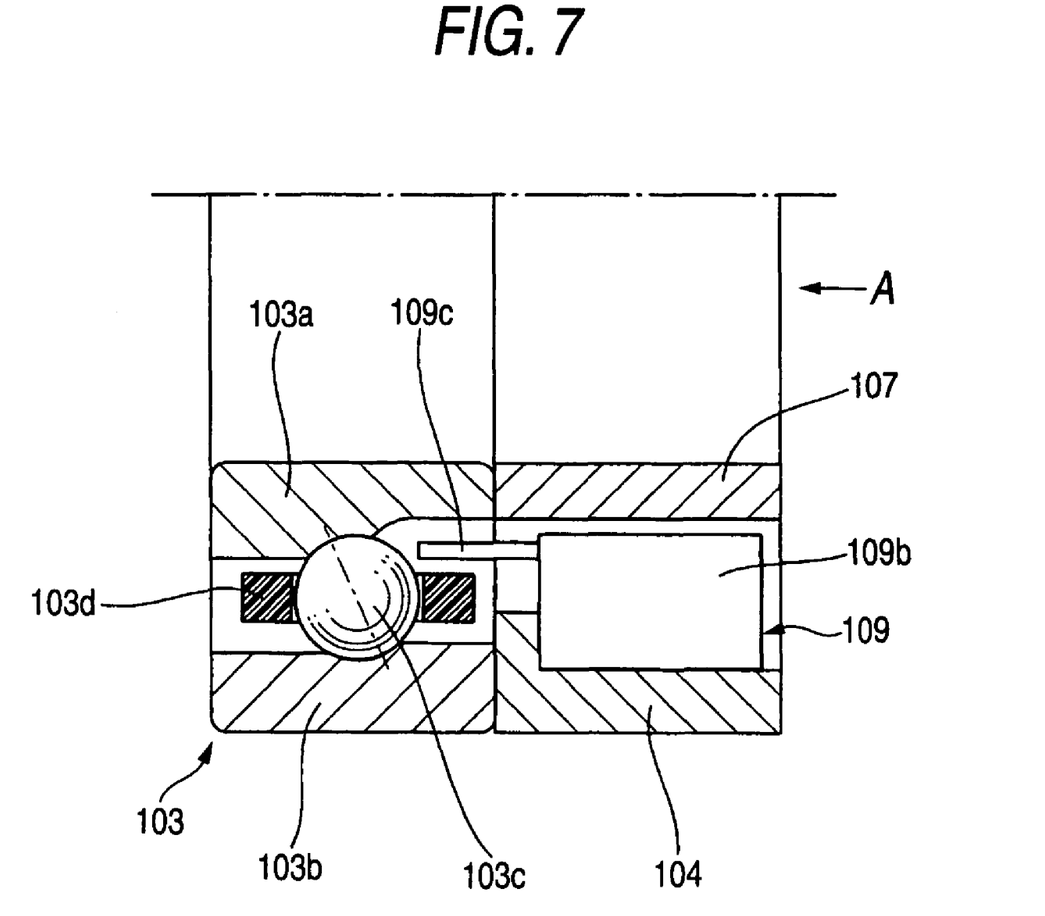
FIG. 7 is an enlarged view of a main part of the configuration shown in FIG. 6.
Figure 8:
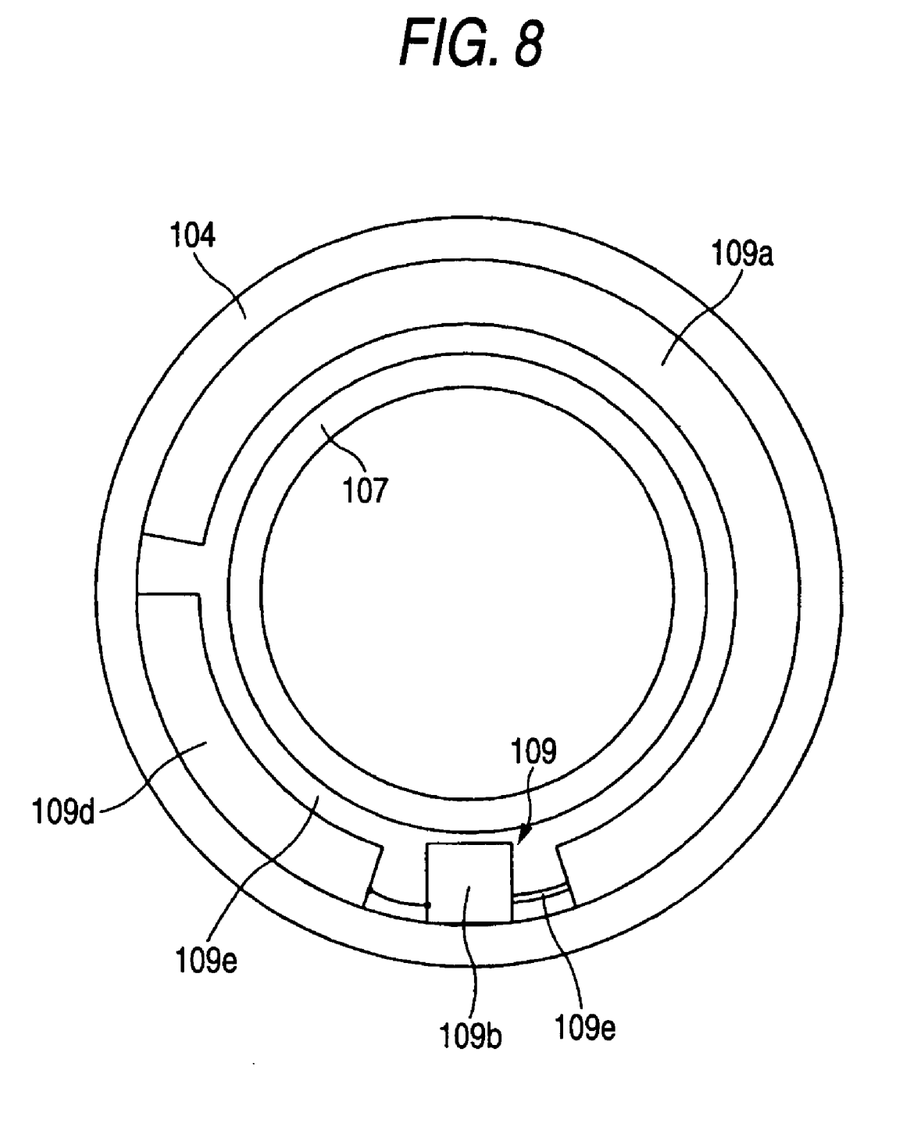
FIG. 8 is a front view of the outer ring spacer as viewed from a direction indicated by an arrow as shown in FIG. 7.

FIG. 6 is a drawing which shows together an axially parallel sectional view which shows the configuration of a spindle as a rotary apparatus according to a third embodiment of the invention and a block diagram which shows the configuration of external lubricating devices. In addition, FIG. 7 is an enlarged view of a main part of the configuration shown in FIG. 6, and FIG. 8 shows front views of an outer ring spacer and an oil supply unit which result as view from a direction indicated by an arrow A in FIG. 7.

A rotary apparatus of the third embodiment is configured such that a spindle 102 housed within a housing 101 is rotatably supported by four angular ball bearings 103. Each angular ball bearing 103 is a general purpose ball bearing which includes an inner ring 103a which is fixedly fitted on the spindle 102, an outer ring 103b which is fitted in the housing 101, a plurality of rolling elements (balls 103c) which are disposed between the inner and outer rings in such a manner as to roll therebetween, and a cage 103d which holds the balls 103c individually at predetermined intervals in a circumferential direction.

An inner flange 101a is formed integrally at one end of the housing 101, and a lid element 101b is screwed on to the other end thereof. The respective outer rings 103 of the angular ball bearings 103 are positioned while being prevented from axial movement by the inner flange 101a, the lid element 101b, cylindrical outer ring spacers 104, . . . 104 which are disposed between the outer rings 103b in such a manner as to follow the inner circumferential surface of the housing 101, and a central spacer 105.

In addition, a stepped portion 102a is formed at an end portion of the spindle 102 where the lid element 101b is fixed to the housing 101, and male or external threads 102b are formed on an end portion of the spindle 102 where the inner flange 101a is formed, whereby a bearing holder 106 is screwed on the external threads 102b. The respective inner rings 103a of the angular ball bearings 103 are positioned while being prevented from axial movement by the stepped portion 102a, the bearing holder 106, inner ring spacers 107, . . . 107 which are disposed between the inner rings 103a in such a manner as to follow an outer circumferential surface of the spindle 102, and a central spacer 108.

A feature of the rotary apparatus of the third embodiment resides in a configuration in which an oil supply unit 109 is incorporated in each of the outer ring spacers 104 which are disposed adjacent, respectively, to the outer rings 103b, which oil supply unit 109 is configured to supply lubricating oil to the corresponding angular ball bearing 103 when receiving a current supplied from a drive power supply 110 for a motor (not shown) which is connected to the spindle. In addition, operations of these oil supply units 109 are controlled in a centralized fashion by signals from a control unit (a programmable controller 111) which controls the rotation of the spindle 102.

As is shown in FIGS. 7 and 8, the oil supply unit 109 is made up mainly of a tank 109a for storing lubricating oil, a pump 109b for sucking out to discharge the lubricating oil stored in the tank 109a, a nozzle 109c which is mounted at a discharge port of the pump 109b and a driver 109d which drives the pump 109b, and these constituent components are fixed to an inner circumferential surface of the outer ring space 104 therealong.

In addition, as is shown in FIG. 7, a distal end of the nozzle 109c enters an annular space defined between the inner ring 103a and the outer ring 103b of the rolling bearing 103 in such a manner as to be made to open above the immediate vicinity of the ball 103c. In addition, the tank 109a and the pump 109b are made to communicate with each other via a pipe 109e.

By the configuration that has been described heretofore, this rotary apparatus itself holds the lubricating function to lubricate the rolling bearings, and hence, there is no need to dispose large-scale appurtenant equipment such as a compressor which is inherent in the conventional rotary apparatus. In addition, if any equipment having the same functions among the equipment of the rolling bearing devices and the rotary apparatus, the equipment can be shared between them. Consequently, the rotary apparatus according to the third embodiment can realize the simplification in configuration and reduction in production costs of the apparatus.

In addition, with this rotary apparatus, by the use of signals from the programmable controller 11 for controlling the oil supply units 9, it becomes possible to implement an elaborate integral control of lubrication in such a way as to match the rotational speed of the rotary apparatus, and hence, no lubricating oil supplied is wasted, thereby making it possible to maintain good lubrication with a small amount of lubricating oil over a long period of time.

In addition, in the third embodiment that has been described heretofore, while the oil supply units 9 are described as being incorporated in the outer ring spacers 4, the invention is not limited thereto, and hence, the oil supply units can be provided in other locations, provided that they are disposed within annular spaces of the respective rolling bearings or disposed in the vicinity thereof on fixed sides of the rolling bearings. For example, the oil supply unit 9 may be provided, for example, on an inner circumferential surface of the outer ring 103b of each angular ball bearing 103, an inner circumferential surface of the lid element 101b which covers the end portion of the housing 101, or an inner circumferential surface of the housing 101 itself.

In addition, in the invention, all the members making up the oil supply unit 109 do not have to be incorporated within the rolling bearing or within the housing 101. As to the tank 109a for supplying lubricating oil, a large tank may be provided inside the housing 101 or outside the housing 101 in such a manner as to supply lubricating oil to the plurality of pumps 109b.

In addition, the pump driving driver 109d does not necessarily have to be disposed in the spacer 104 but may be disposed within or in the vicinity of the annular space of the rolling bearing, or in the vicinity of the controller 111 outside the housing 101, or the like. Furthermore, the pump driving drivers 109b may be provided integrally in a location inside the housing 101 or the outside the housing 101, or the programmable controller 111 may be caused to displace the function of the pump driving drivers 109b. By adopting the configuration that has just been described, there is provided merit that the capacity of the lubricating oil tank can be increased largely.

Furthermore, in the third embodiment, while the configuration is described in which the control of the oil supply units 109 is managed by the programmable controller 111, with the rotary apparatus of the invention, the controller 111 can be made to control the rotation of the spindle as well. With this configuration, the whole of the rotary apparatus including the lubrication of the spindle can preferably be controlled in a centralized fashion. Note that while in this embodiment, the power supply for the motor connected to the spindle is described as being shared with the oil supply units 109, power supplies may be provided separately for the motor and the oil supply units.

Furthermore, the power supply for supplying power to the oil supply units 109 may be incorporated with the power supply for the programmable controller 111. In this case, the operations and discharge amounts of the oil supply units 109 can be controlled only by switching ON/OFF the current that is supplied to the oil supply units 109. In addition, by adopting this configuration, the controller 111 and the oil supply units 109 can be connected to each other only by a cord which supplies a current to the oil supply units, the layout of wiring being thereby simplified.

The rotary apparatus of the invention can, of course, be applied to various types of rotary apparatuses which have other rotational shafts than the spindle, and the invention can be applied to rotary apparatuses which utilize other rolling bearings than the angular ball bearing. Furthermore, there is no specific limitation on the number of rolling bearings provided, and the invention can, needless to say, be applied equally not only to a rolling bearing in which an outer ring is used as a stationary ring but also to a rolling bearing in which an inner ring is used as a stationary ring.

The invention claimed is:

1. A rolling bearing device comprising:
   a rolling bearing comprising an inner ring, an outer ring, a plurality of rolling elements which is rollably disposed between the inner ring and the outer ring, and an annular cage for holding the plurality of rolling elements at predetermined intervals in a circumferential direction;
   a nozzle which communicates with a tank for storing lubricating oil and is inserted between an inner circumferential surface of the cage and the inner ring and made to open; and
   a pump which supplies the lubricating oil stored within the tank into the rolling bearing via the nozzle,
   wherein the inner circumferential surface of the cage is formed such that an inside diameter of the cage is gradually reduced in a continuous or intermittent fashion from an axial center portion side towards an end surface portion on a side where the nozzle is inserted,
   wherein the inner ring includes a concave portion disposed axially adjacent to a raceway surface of the inner ring, the concave portion including:
      a diameter decreasing part including a diameter which decreases in a direction away from the raceway surface of the inner ring; and
      a diameter increasing part including a diameter which increases and communicates with the diameter decreasing part, and
   wherein a distal-end opening of the nozzle radially overlaps with the diameter decreasing part.

2. The rolling bearing device according to claim 1, wherein a portion of the inner circumferential surface of the cage which lies on an opposite side to the side where the nozzle is inserted is formed such that the inside diameter of the cage is gradually reduced in a continuous or intermittent fashion from the axial center portion side towards an end face on the opposite side.

3. The rolling bearing device according to claim 1, wherein the nozzle discharges the lubricating oil onto the inner circumferential surface of the cage such that the lubricating oil flows over the inner circumferential surface of the cage toward the axial center portion side of the inner circumferential surface of the cage.

4. The rolling bearing device according to claim 1, wherein the nozzle comprises an end that faces the plurality of rolling elements.

5. A rolling bearing device comprising:
   a rolling bearing disposed inside a housing for supporting a rotating shaft rotatably relative to the housing and comprising an outer ring, an inner ring and a plurality of rolling elements which is interposed between the outer ring and the inner ring;
   a pump provided within or in a vicinity of an annular space defined between the outer ring and the inner ring;
   a nozzle disposed in the annular space at least at one end thereof in such a manner as to be made to open in the annular space and made to communicate with a discharge port of the pump at another end thereof;
   a tank for storing therein lubricating oil made to communicate with the pump; and
   a pump driving driver connected to the pump for controlling a lubricating oil discharge amount of the pump,
   wherein the pump driving driver is connected to an external power supply which is set externally of the housing to activate the pump by a current supplied from the external power supply so as to supply the lubricating oil stored in the tank from the opening provided at the one end of the nozzle into the annular space,
   wherein the inner ring includes a concave portion disposed axially adjacent to a raceway surface of the inner ring, the concave portion including:
      a diameter decreasing part including a diameter which decreases in a direction away from the raceway surface of the inner ring; and
      a diameter increasing part including a diameter which increases and communicates with the diameter decreasing part, and
   wherein a distal-end opening of the nozzle radially overlaps with the diameter decreasing part.

6. The rolling bearing device according to claim 5, wherein the tank is disposed in the vicinity of the pump.

7. The rolling bearing device according to claim 5, wherein the nozzle comprises an end that faces the plurality of rolling elements.

8. A rolling bearing device comprising:
a plurality of rolling bearings disposed coaxially inside a housing for supporting a rotating shaft rotatably relative to the housing, each of the rolling bearings including raceway members made up of an outer ring and an inner ring and a plurality of rolling elements which is disposed between the raceway members;
pumps which are provided respectively within or in the vicinity of annular spaces defined between the raceway members of the plurality of rolling bearings;
nozzles disposed respectively in the annular spaces of the plurality of rolling bearings at one end thereof so as to be made to open in the annular spaces and made to communicate, respectively, with discharge ports of the pumps at another end;
a tank for storing therein lubricating oil made to communicate with the pumps; and
pump driving drivers connected respectively to the pumps for controlling respective lubricating oil discharge amounts of the pumps,
wherein the pump driving drivers are connected to a controller which is disposed externally of the housing and transmits signals and controls respective operations of the drivers, and
wherein the pump driving drivers are connected to an external power supply which is set externally of the housing to activate the pumps by a current supplied from the external power supply so as to supply the lubricating oil stored in the tanks from the openings provided at the one end of the nozzles into the annular spaces, respectively,
wherein the inner ring includes a concave portion disposed axially adjacent to a raceway surface of the inner ring, the concave portion including:
a diameter decreasing part including a diameter which decreases in a direction away from the raceway surface of the inner ring; and
a diameter increasing part including a diameter which increases and communicates with the diameter decreasing part, and
wherein a distal-end opening of a nozzle of the nozzles radially overlaps with the diameter decreasing part.

9. The rolling bearing device according to claim 8, wherein tanks are disposed in the vicinity of the pumps, respectively, for supplying lubricating oil individually to the pumps.

10. The rolling bearing device according to claim 8, wherein the controller transmits signals which control the discharge of lubricating oil to the pumps, respectively when the rotating shaft is rotated.

11. A rotary apparatus in which a rotating shaft disposed within a housing thereof is supported by the rolling bearing device according to claim 8.

12. The rotary apparatus according to claim 11, wherein the rotating shaft is driven by a motor, and the external power supply of the rolling bearing doubles as a drive power supply for the motor.

13. The rotary apparatus according to claim 11, wherein the rotating shaft is driven by a motor of which drive control is performed by the controller, and the drive control of the motor and the control of the pump driving drivers are controlled by the controller in conjunction with each other.

14. The rolling bearing device according to claim 8, wherein the pumps are provided within the annular spaces defined between the raceway members of the plurality of rolling bearings.

15. The rolling bearing device according to claim 8, wherein the pumps are provided on the housing and outside of the annular spaces defined between the raceway members of the plurality of rolling bearings.

16. The rolling bearing device according to claim 8, wherein the pumps are provided on lid elements that cover an end portion of the housing and outside of the annular spaces defined between the raceway members of the plurality of rolling bearings.

17. The rolling bearing device according to claim 8, wherein the nozzles comprise ends that face the plurality of rolling elements.

18. A rolling bearing device comprising:
a plurality of rolling bearings disposed coaxially inside a housing for supporting a rotating shaft rotatably relative to the housing, each of the rolling bearings including raceway members made up of an outer ring and an inner ring and a plurality of rolling elements which is disposed between the raceway members;
pumps which are provided respectively within or in the vicinity of annular spaces defined between the raceway members of the plurality of rolling bearings;
nozzles disposed respectively in the annular spaces of the plurality of rolling bearings at one end thereof so as to be made to open in the annular spaces and made to communicate, respectively, with discharge ports of the pumps at another end;
a tank for storing therein lubricating oil made to communicate with the pumps; and
pump driving drivers connected respectively to the pumps for controlling respective lubricating oil discharge amounts of the pumps,
wherein the pump driving drivers are connected to a controller which is disposed externally of the housing and controls respective operations and lubricating oil discharge amounts of the pumps by permitting and prohibiting a flow of a current supplied from the external power supply,
wherein the pump driving drivers are connected to an external power supply which is set externally of the housing to activate the pumps by a current supplied from the external power supply so as to supply the lubricating oil stored in the tanks from the openings provided at the one end of the nozzles into the annular spaces, respectively,
wherein the inner ring includes a concave portion disposed axially adjacent to a raceway surface of the inner ring, the concave portion including:
a diameter decreasing part including a diameter which decreases in a direction away from the raceway surface of the inner ring; and
a diameter increasing part including a diameter which increases and communicates with the diameter decreasing part, and
wherein a distal-end opening of a nozzle of the nozzles radially overlaps with the diameter decreasing part.

19. The rolling bearing device according to claim 18, wherein the nozzles comprise ends that face the plurality of rolling elements.

* * * * *

UNITED STATES PATENT AND TRADEMARK OFFICE
CERTIFICATE OF CORRECTION

| | | |
|---|---|---|
| PATENT NO. | : 7,883,271 B2 | Page 1 of 1 |
| APPLICATION NO. | : 11/795311 | |
| DATED | : February 8, 2011 | |
| INVENTOR(S) | : Suzuki et al. | |

It is certified that error appears in the above-identified patent and that said Letters Patent is hereby corrected as shown below:

Title Page:

(86) PCT No.: replace "PCT/JP2006/000450" with "PCT/JP2006/300450".

Signed and Sealed this
Twenty-eighth Day of June, 2011

David J. Kappos
*Director of the United States Patent and Trademark Office*